(No Model.)

J. B. ODELL.
GALVANIC BATTERY.

No. 275,845. Patented Apr. 17, 1883.

WITNESSES.
Wm Sluyter
Chas. V. Freiss

INVENTOR.
John B. Odell
by Pliny B. Smith
his atty.

UNITED STATES PATENT OFFICE.

JOHN B. ODELL, OF CHICAGO, ILLINOIS.

GALVANIC BATTERY.

SPECIFICATION forming part of Letters Patent No. 275,845, dated April 17, 1883.

Application filed January 3, 1883. (No model.)

*To all whom it may concern:*

Be it known that I, JOHN B. ODELL, of the city of Chicago, county of Cook, and State of Illinois, have invented a certain new and useful Improvement in Galvanic Batteries, of which the following is a specification, reference being had to the accompanying drawings.

My invention relates more especially to the class of batteries consisting of a single cell in which two or more plates are joined together to form one element of a couple; and the object of my invention is to produce a battery that shall be easily and safely portable, convenient in use, and simple and inexpensive in construction.

Figure 1:
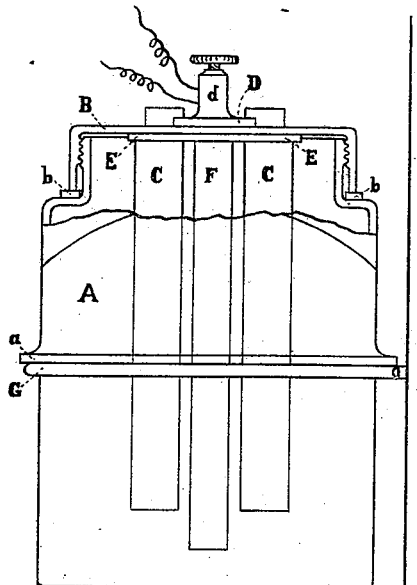
Figure 2:
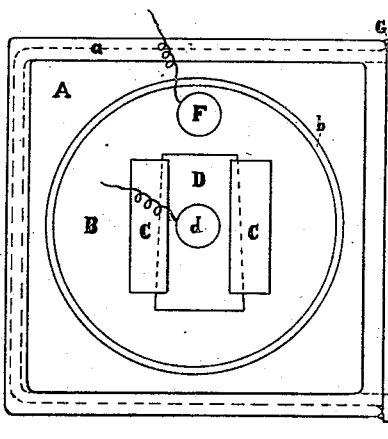
Figure 4:
Figure 3:
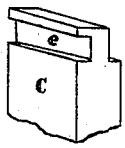

In the drawings, Figure is a side elevation of the battery, showing it secured against a vertical support. Fig. 2 is a top view. Fig. 3 is a perspective view of the upper portion of one of the negative plates; and Fig. 4 is the key which secures the plates in the cap of the cell, like letters indicating like parts in the different figures.

The cell consists of an ordinary glass jar, on the periphery of which, at or near its center, is blown the bead $a$, by which the cell may be supported, as hereinafter described. The cap B of the cell is preferably of glass, but may be of any insulating material, and is provided with the downwardly-extending flange, which, as also the neck of the jar, is provided with a screw-thread, whereby the cap may be screwed upon the cell. Upon the shoulder of the jar is placed the rubber gasket $b$, upon which the flange of the cap presses, thus forming a water-tight joint.

The plates C C are represented in the drawings as of carbon. At the upper part of each plate is formed a tenon, as shown in Fig. 3, on one face of which is cut a groove, $c$. Upon the shoulders of the plates formed by cutting the tenons is a rubber gasket or packing, E E. In the cap are two openings, through which are thrust the tenons of the plate C C, with the faces containing the grooves confronting each other, and the upper edges of the grooves being above the top of the cap.

The key D is of metal and slightly wedge-shaped, and of a width and thickness to adapt it to slide in the grooves $c c$ when the plates are inserted in the cap. The key is firmly pressed into the grooves, drawing the shoulders of the plates against the cap, securing the plates rigidly in the cap, and compressing the packing E between the cap and the shoulders, and making these joints also water-tight. The key, being a conductor, makes the plates C C electrically a unit, and it is provided with the binding-post $d$, in which one wire of the circuit is secured.

F is the zinc or positive element of the battery, which also projects through a suitable opening provided in the cap, in which it is secured and packed with rubber. It is provided with a binding-post, in which is secured the other wire of the battery. When the elements of the battery are thus secured and immersed in the bath, and the cap screwed on the cell, the cell is water-tight and may be moved from place to place without danger of spilling the solution. A staple or bracket, G, of the proper size, may be driven into or secured to the wall or any vertical support, and the cell set therein, the bead $a$ resting on the staple or bracket and supporting the cell, which is thus safely and conveniently disposed of for use. A lug or series of lugs may be formed on the jar instead of the bead.

I do not confine myself to the use of the materials which I have mentioned, as the same construction may be adopted with whatever materials used.

Having thus described my invention, what I claim as new, and desire to secure by Letters Patent, is—

1. The plates C C, provided with tenons having grooves therein, in combination with the conducting-key D for securing them in the cap of the cell.

2. The battery composed of the cell with the cap screwed thereon, and the gasket $b$, interposed between them, the elements C C and F, secured and packed in the cap, and the key D.

3. In a galvanic battery, the combination of the perforated cap B, plates A A, and key D, provided with a binding-post, $d$.

4. The combination of the cell A, provided with the perforated cap B, screwed thereon, and the gasket $b$, interposed between them, the plates C C, with their packing, and secured in the cap by the key D, and the element F, secured and packed in the cap.

J. B. ODELL.

Witnesses:
 PLINY B. SMITH,
 M. L. BEERS.